United States Patent
Birnbaum et al.

(10) Patent No.: US 12,542,959 B2
(45) Date of Patent: Feb. 3, 2026

(54) MAGNETIC CAMERA BRAKE

(71) Applicant: Apple Inc., Cupertino, CA (US)

(72) Inventors: Zachary W. Birnbaum, Santa Clara, CA (US); Andrew S. Jozefov, San Francisco, CA (US); Scott W. Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 262 days.

(21) Appl. No.: 18/361,351

(22) Filed: Jul. 28, 2023

(65) Prior Publication Data

US 2024/0040218 A1 Feb. 1, 2024

Related U.S. Application Data

(60) Provisional application No. 63/370,028, filed on Aug. 1, 2022.

(51) Int. Cl.
| | |
|---|---|
| *H04N 23/54* | (2023.01) |
| *G03B 3/10* | (2021.01) |
| *H02K 41/035* | (2006.01) |
| *H02K 49/04* | (2006.01) |
| *H04N 23/51* | (2023.01) |
| *H04N 23/57* | (2023.01) |

(52) U.S. Cl.
CPC ............... *H04N 23/54* (2023.01); *G03B 3/10* (2013.01); *H02K 41/0356* (2013.01); *H02K 49/046* (2013.01); *H04N 23/51* (2023.01); *H04N 23/57* (2023.01)

(58) Field of Classification Search
None
See application file for complete search history.

(56) References Cited

U.S. PATENT DOCUMENTS

| | | | |
|---|---|---|---|
| 10,890,734 B1 * | 1/2021 | Sharma | H02P 6/30 |
| 2008/0063390 A1 * | 3/2008 | Hsiao | G03B 3/10 |
| | | | 396/133 |
| 2011/0002681 A1 * | 1/2011 | Yamashita | G02B 7/102 |
| | | | 396/133 |
| 2021/0173224 A1 * | 6/2021 | Seo | G03B 5/02 |

(Continued)

FOREIGN PATENT DOCUMENTS

KR 20110086935 A * 8/2011 ............... G03B 3/10

*Primary Examiner* — Paul M Berardesca
(74) *Attorney, Agent, or Firm* — Blank Rome LLP

(57) ABSTRACT

Various magnetic camera brake embodiments are disclosed. According to some embodiments, the magnetic camera brakes leverage a magnetic attraction (or repulsion) force between an iron and magnetic body to hold the moving camera components at a desired focus position—even under high amplitude acceleration loads. When high disturbance rejection is desired, the magnet attracts the camera to the desired focus position (e.g., an infinity focus position) with enough force to overcome approximately 10 g's of external acceleration. In some embodiments, ball bearings may be used to provide constraints in up to 5 degrees of freedom (e.g., all but z-axial translation along the optical axis), so there is no rocking of the image sensor (or lens barrel). When "macro" photos are desired of subjects closer than the hyperfocal distance, an actuator mechanism may be configured to pull the image sensor out of the desired focus position and into the macro focus region.

20 Claims, 15 Drawing Sheets

(56) References Cited

U.S. PATENT DOCUMENTS

| | | | |
|---|---|---|---|
| 2021/0281759 A1* | 9/2021 | Seo ..................... | G02B 27/646 |
| 2022/0091363 A1* | 3/2022 | Kang ..................... | G02B 7/102 |
| 2023/0217106 A1* | 7/2023 | Park ................... | H02K 41/0354 |
| | | | 348/333.01 |

* cited by examiner

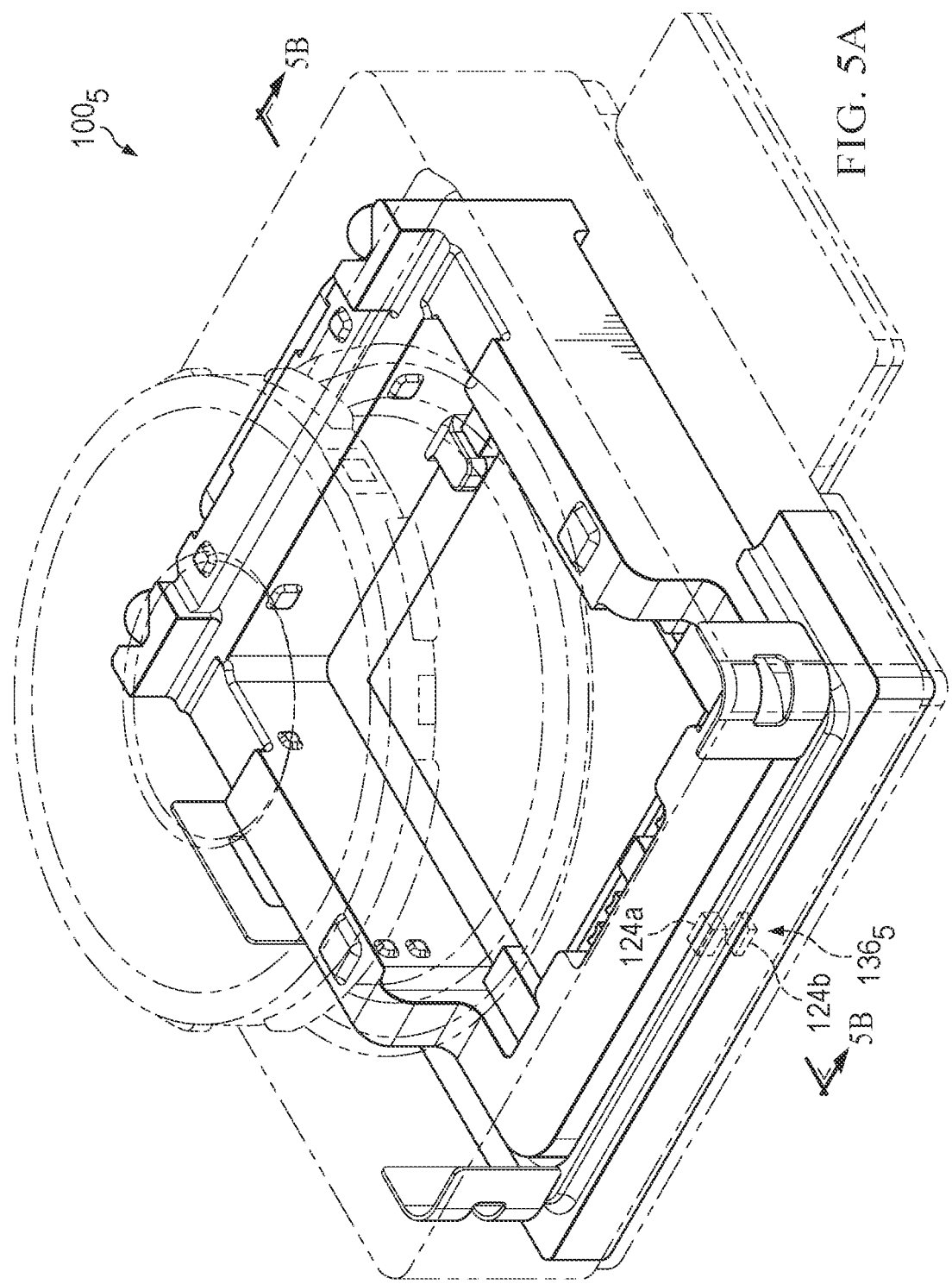

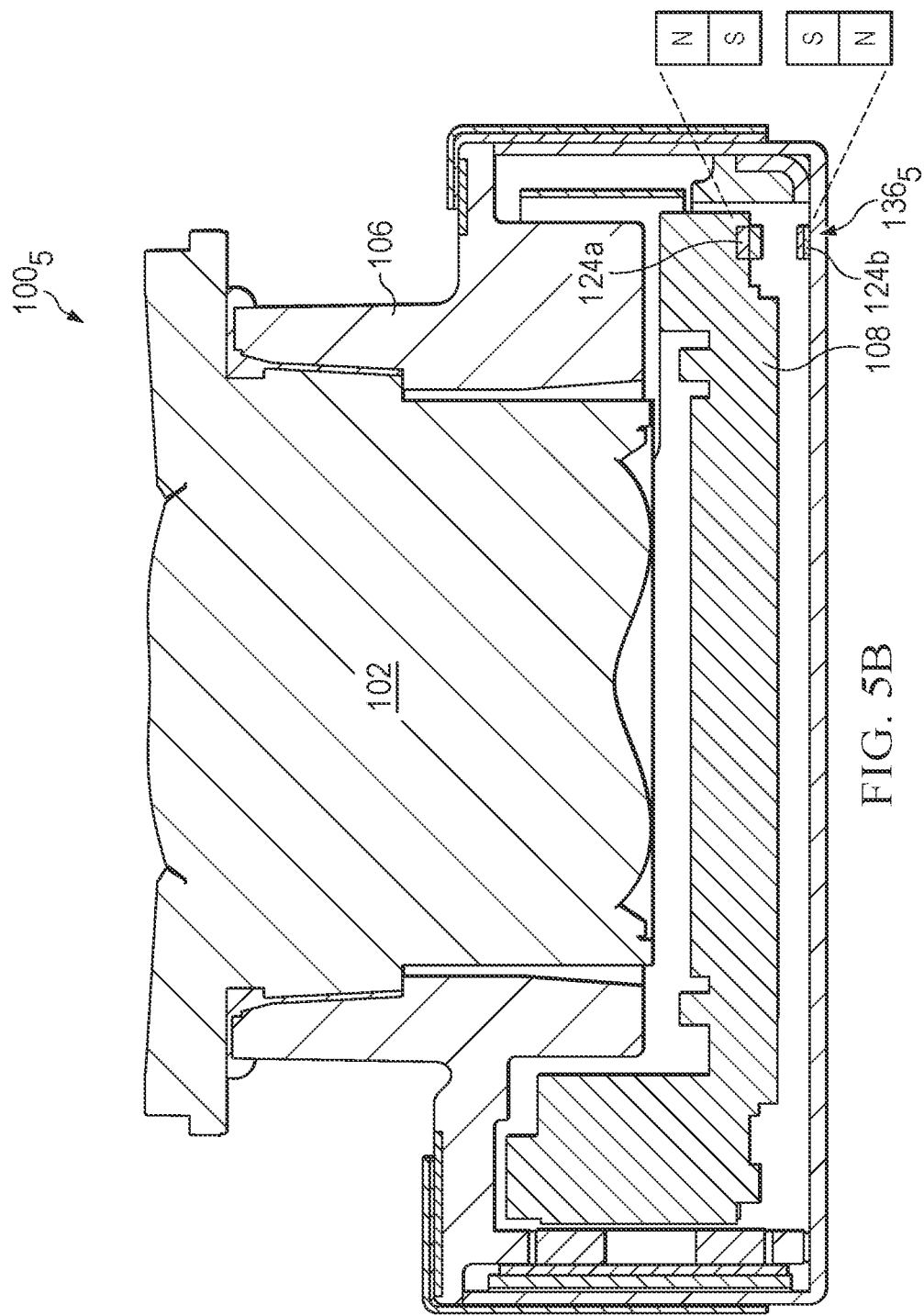

MAGNETIC CAMERA BRAKE

CROSS-REFERENCE TO RELATED APPLICATIONS

The present application claims priority to U.S. Provisional Application No. 63/370,028 filed Aug. 1, 2022. The aforementioned application is hereby incorporated by reference in its entirety.

BACKGROUND

Digital cameras capture digital images using one or more image sensors. A digital camera typically includes at least one lens that focuses captured light onto an image sensor. Due to physics and lens optics, cameras can typically only capture objects clearly within a limited range of distance from the camera. Therefore, cameras often include a focus mechanism that is able to adjust the range of objects distances that may be captured clearly by the camera. Some cameras may also include an autofocus (AF) mechanism to automatically focus on a particular object or portion of a scene, e.g., an object that is very close to the camera (e.g., a "macro image," capturing an object within a few centimeters of the camera) or very far from the camera (e.g., an "infinity image," capturing object that are several meters or more away from the camera, also referred to as a "hyperfocal" focus position). This auto focusing may be done by either moving the lens with respect to the image sensor or by moving the image sensor with respect to the lens.

Some cameras with autofocus are used in high acceleration environments, such as mounted on bicycle handlebars, pushed against a car, airplane, or train window, or on a mechanism with rotating machinery, like a motorcycle or drone, where the frequency of rotating parts couples to the camera. Traditional cameras, e.g., those with low stiffness autofocus systems, will shake around a large amount under these conditions, leading to blurry photos and videos.

The subject matter of the present application is thus directed to a camera that includes an autofocus mechanism, but that is also able to capture sharp images over a range of focus positions—even in high acceleration environments.

BRIEF SUMMARY

Various improved camera module designs are disclosed herein, comprising: a sensor configured to capture an image; a lens with an optical axis, wherein the lens is configured to focus light from an object onto the sensor to capture the image, and wherein the sensor is movable relative to the lens along the optical axis; and a magnetic brake that holds the sensor relative to the lens in a desired focus position.

According to some embodiments, the desired focus position is at an infinity focus position for the camera module.

According to some embodiments, the camera module further comprises: a lens holder that holds the lens; and a sensor carrier that carries the sensor.

According to some embodiments, the magnetic brake comprises: a magnet included in the lens holder; and a ferromagnetic material included in the sensor carrier.

According to some embodiments, the magnetic brake comprises a magnet included in the sensor carrier, and a ferromagnetic material included in the lens holder.

According to some embodiments, the magnetic brake comprises two magnets, wherein a first magnet is included in the sensor carrier and a second magnet is included in the lens holder.

According to some embodiments, the first magnet and second magnet are configured to attract each other, thereby pulling the sensor carrier towards the desired focus position.

According to some embodiments, the camera module further comprises a housing, wherein the magnetic brake comprises two magnets, wherein a first magnet is included in the sensor carrier and a second magnet is included in the housing.

According to some embodiments, the first and second magnet are configured to repel each other, thereby pushing the sensor carrier towards the desired focus position.

According to some embodiments, the ferromagnetic material comprises one or more of: alnico, bismanol, caesium hexafluorocobaltate(IV), californium, chromium(IV) oxide, cobalt, cobalt ferrite, complex oxide, dysprosium, erbium, Europium hydride, fernico, ferrite (magnet), gadolinium, gallium manganese arsenide, greigite, heusler compound, hexagonal ferrite, holmium, iron, KS steel, magnadur, magnetic 2D materials, magnetic semiconductor, magnetite, metglas, MKM steel, monostrontium ruthenate, neodymium magnet, nickel, permalloy, polder tensor, rareearth magnet, samarium-cobalt magnet, sendust, suessite, terbium, uranium hydride, vicalloy, and yttrium iron garnet.

According to some embodiments, the desired focus position comprises a locked position for the camera module.

According to some embodiments, the camera module further comprises an actuator mechanism that is configured to be able to release the magnetic brake from the desired focus position when activated.

According to some embodiments, the actuator mechanism comprises a voice coil actuator.

According to some embodiments, the camera module further comprises a spring that provides a soft end stop for the sensor carrier at the desired focus position.

According to some embodiments, the spring further comprises a spring bumper.

According to some embodiments, the spring bumper is formed of a low durometer polymer material (e.g., that is more compliant than the spring or other plastic parts within the camera module).

According to some embodiments, the spring is configured to be in a partially compressed state when the sensor is in the desired focus position.

According to some embodiments, the magnetic brake comprises a single magnet and a single corresponding aligned ferromagnetic material.

According to some embodiments, the magnetic brake comprises a pair of magnets and a pair of corresponding aligned ferromagnetic materials.

According to some embodiments, the magnetic brake comprises at least one pair of single polarization directional magnets oriented to attract one another.

According to other embodiments, a camera module design is disclosed, comprising: a sensor configured to capture an image; a lens with an optical axis, wherein the lens is configured to focus light onto the sensor to capture the image, and wherein the lens is movable relative to the sensor along the optical axis; and a magnetic brake that holds the lens relative to the sensor in a desired focus position.

According to some such embodiments, the desired focus position is at an infinity focus position for the camera module.

According to some such embodiments, the camera module further comprises: a lens holder that holds the lens carries the lens relative to the sensor; and a sensor carrier.

According to some such embodiments, the magnetic brake comprises: a magnet included in the lens holder; and a ferromagnetic material included in the sensor carrier.

According to some such embodiments, the magnetic brake comprises a magnet included in the sensor carrier, and a ferromagnetic material included in the lens holder.

According to some such embodiments, the desired focus position comprises a locked position for the camera module.

According to some such embodiments, the camera module further comprises an actuator mechanism that is configured to be able to release the magnetic brake from the desired focus position when activated.

According to some such embodiments, the camera module further comprises a spring that provides a soft end stop for the lens holder at the desired focus position.

According to still other embodiments, a magnetic brake mechanism for a camera module is disclosed, comprising: a first magnet; and a first ferromagnetic material, wherein the first magnet and first ferromagnetic material are configured to attract or repel each other, thereby moving one or more components of the camera module towards a desired focus position.

According to some such embodiments, a spring provides a soft end for the one or more moving components of the camera module at the desired focus position.

According to yet other embodiments, a magnetic brake mechanism for a camera module is disclosed, comprising: a first magnet; and a second magnet, wherein the first magnet and second magnet material are configured to attract or repel each other, thereby moving one or more components of the camera module towards a desired focus position.

According to some such embodiments, a spring provides a soft end for the one or more moving components of the camera module at the desired focus position.

Various methods, systems, and integrated circuits and/or other non-transitory program storage devices having instructions stored thereon causing one or more processors to perform the techniques described herein are also contemplated by this disclosure.

BRIEF DESCRIPTION OF THE DRAWINGS

FIG. 5A shows an isometric view of a camera module having dual brake magnets mounted in an orientation causing them to repel from each other, according to some embodiments.

FIG. 5B shows a cross-section of the camera module of FIG. 5A, according to some embodiments.

DETAILED DESCRIPTION

Various magnetic camera brake embodiments are disclosed herein. According to some such embodiments, the magnetic camera brakes leverage a magnetic attraction or repulsive force between an iron and magnetic body (or between multiple magnetic bodies) to lock the relative motion of moving camera components at a desired optical focus position (e.g., an infinity focus position)—even under high amplitude acceleration loads.

When high disturbance rejection is desired, the magnet attracts the camera to a hyperfocal (i.e., infinity) focus position (which may, e.g., be at a hard stop or a soft stop position) with enough force to overcome approximately 10 g's of external acceleration. In some embodiments, ball bearings may be used to provide constraints in up to 5 degrees of freedom (e.g., all but z-axial translation along the optical axis), so there is no rocking of the image sensor (or lens barrel).

When "macro" photos are desired of subjects closer than the hyperfocal distance, an actuator mechanism may be configured to be strong enough to pull the image sensor out of the desired focus position that it is being held in by the camera brake(s) and into the macro focus region, when necessary.

Figure 1A:
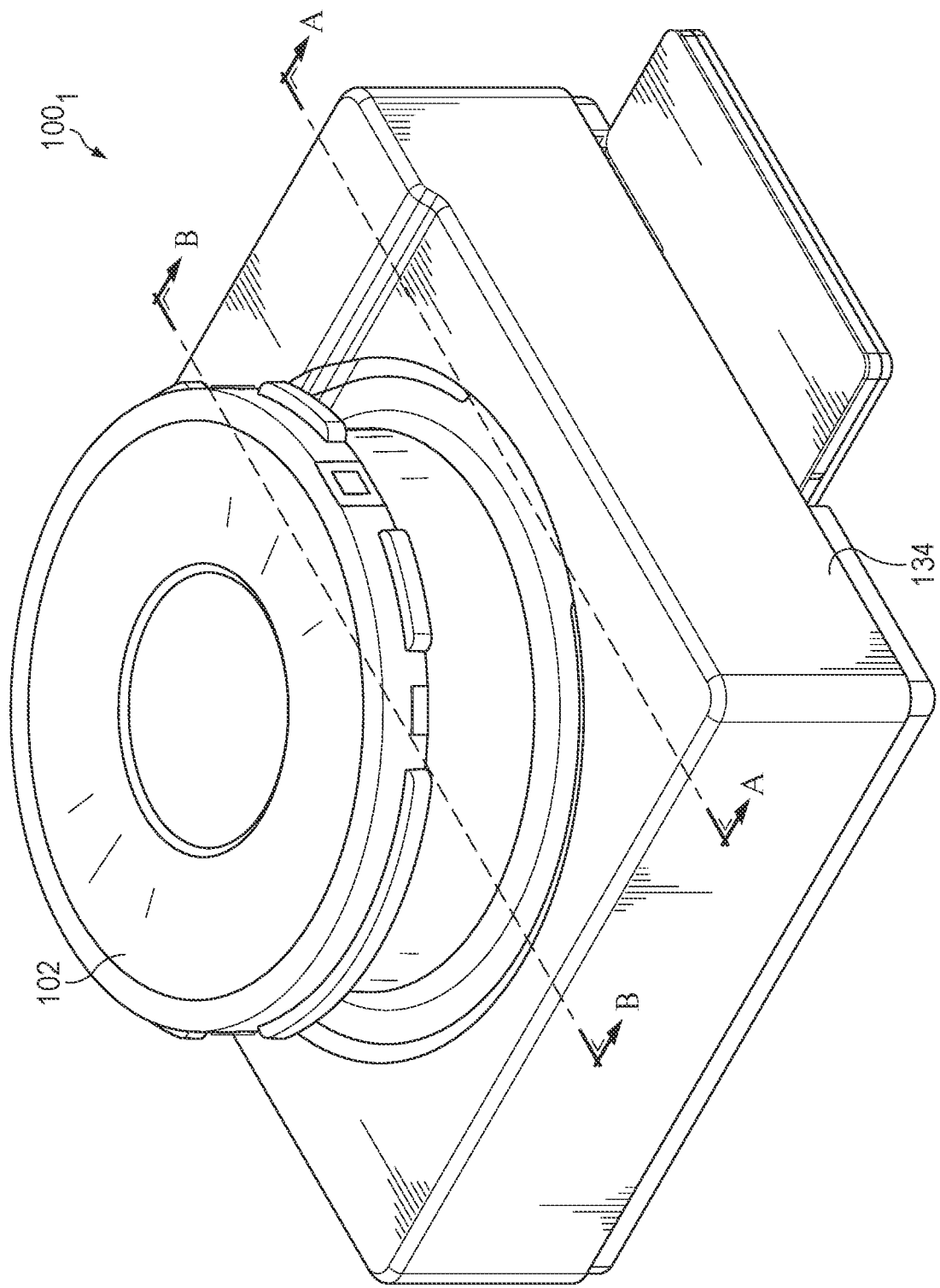
FIG. 1A shows an isometric view of a camera module, according to some embodiments.

Turning now to FIG. 1A, an isometric view of a camera module $100_1$ is shown, according to some embodiments. The camera module $100_1$ includes a main body 134 and a lens barrel 102. The camera module $100_1$ includes a representation of two cross-sections A-A and B-B, which cross-sections will be referred to throughout. A-A is a cross-section that is offset from the center of the lens barrel 102 towards the edge of the camera module, and B-B is a cross-section that crosses through the center of lens barrel 102. Certain components of the main body 134 are shown in greater detail in FIG. 1B.

Figure 1B:
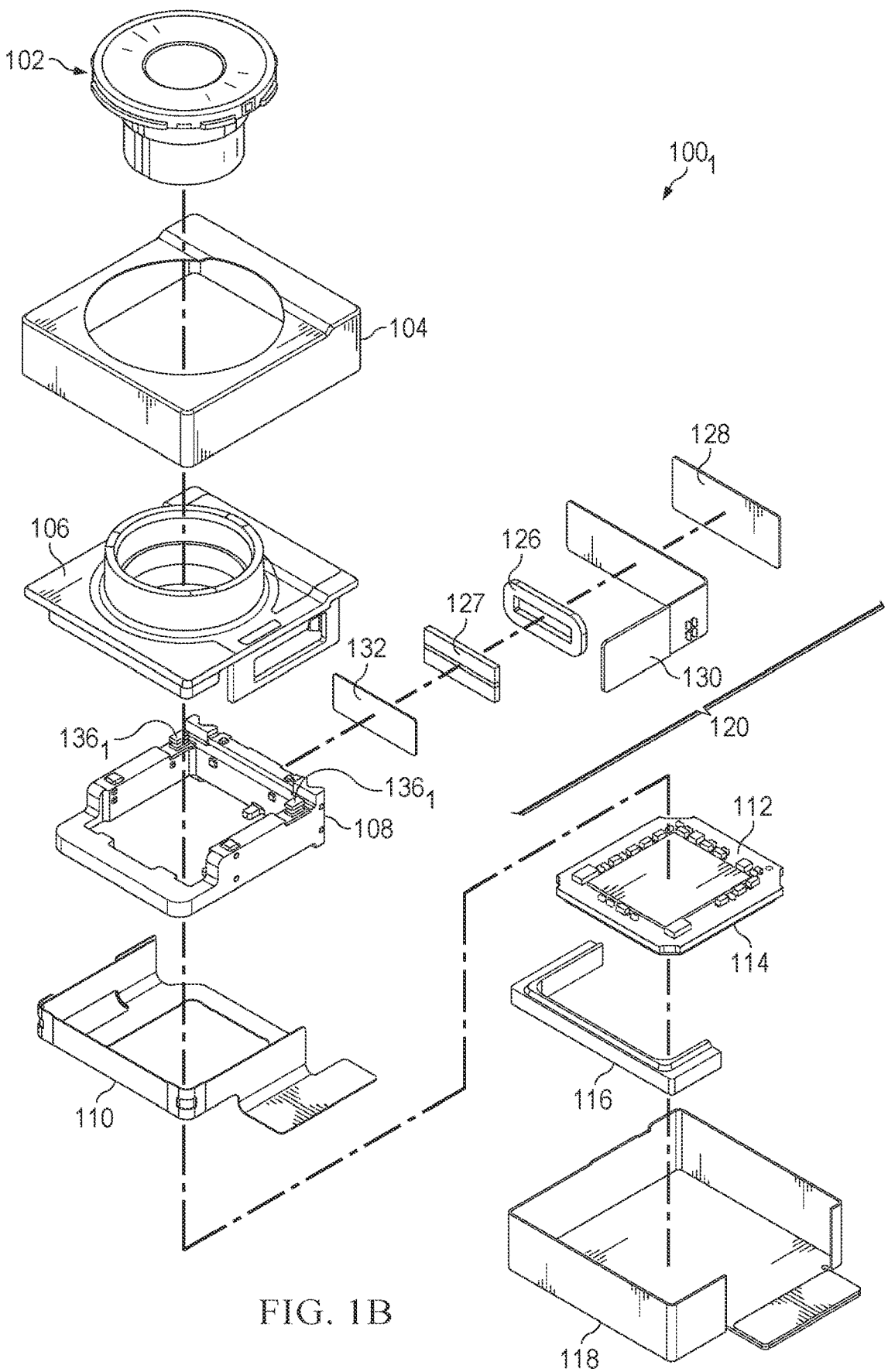
FIG. 1B shows an exploded view of the camera of FIG. 1A, according to some embodiments.

FIG. 1B shows an exploded view of the camera module $100_1$ of FIG. 1A, according to some embodiments. The main body 134 includes a baffle 104 and lens holder 106, in which the lens barrel 102 is mounted. Camera module $100_1$ may further include a sensor carrier 108, which, in some embodiments, is configured to raise and lower an image sensor (disposed on the bottom side of substrate 114) with respect to the fixed lens barrel 102, so as to perform autofocusing (AF) operations for the camera module $100_1$.

Camera module $100_1$ may further include a dynamic flex 110 surrounding the sensor carrier 108, an infrared cutoff filter 112, a molded end stop 116 to stops the translation of the sensor carrier 108 in the x- and y-axial directions in a drop or shock scenario, and a shield can 118, wrapped around the exterior of the camera module $100_1$. The camera module $100_1$ also includes an actuator mechanism 120, which may be comprised of: a preload plate 128, a rigid flex 130, a coil 126, a drive magnet 127, and a back iron plate 132.

FIG. 1B also shows an exemplary magnetic brake mechanism $136_1$, in accordance with some embodiments disclosed herein. Magnetic brakes $136_1$ are but one possible configuration to implement a magnetic brake mechanism in a camera module. Various other configurations will be described in detail below, with reference to the remaining Figures. According to some embodiments, the drive magnet 127, coil 126, and back iron plate 132 are advantageously sized to be large enough to be able to overpower the various magnetic brake mechanisms 136 that will be described herein, if or when necessary.

Figure 2A:
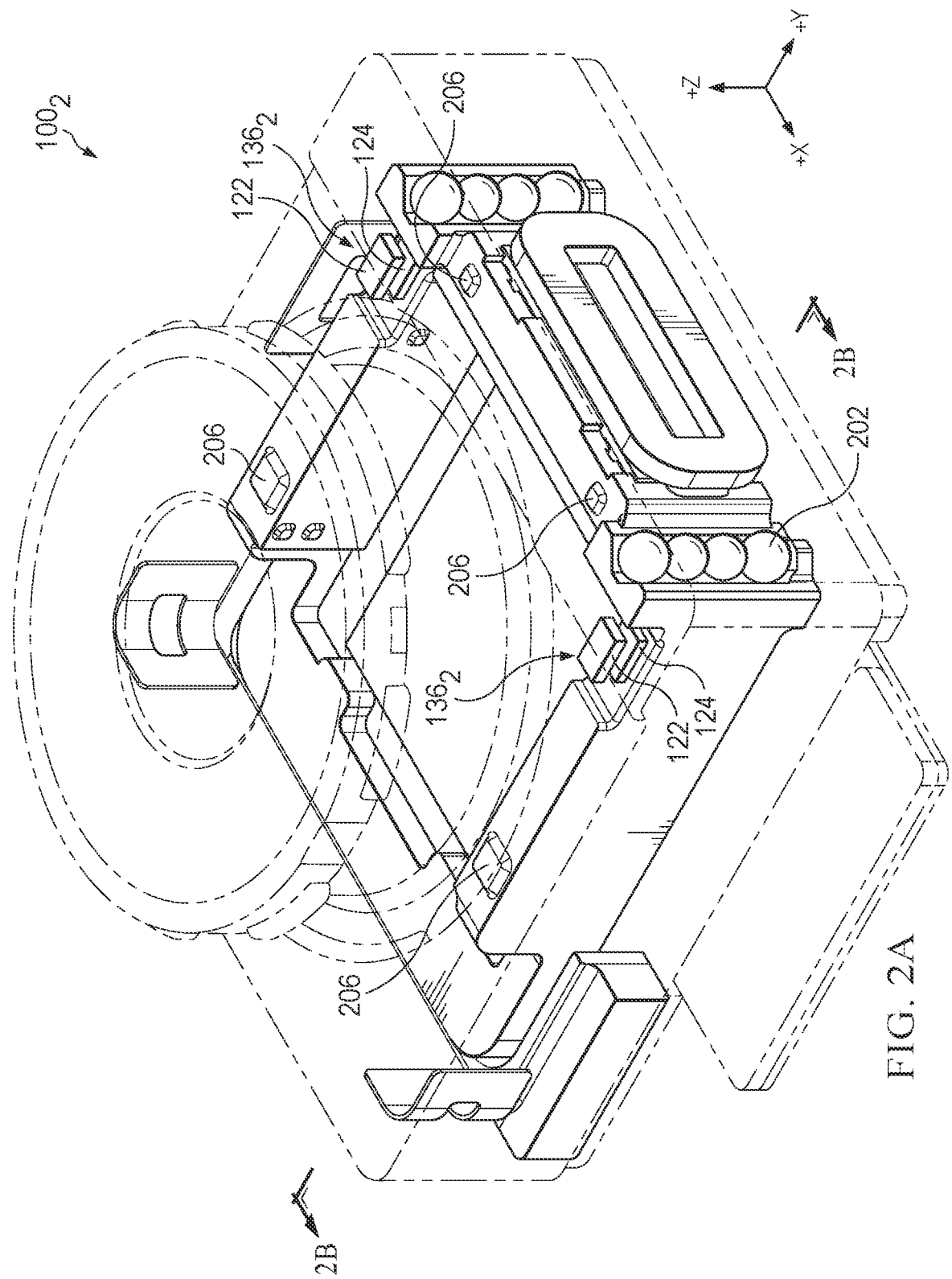
FIG. 2A shows an isometric view of a camera module having brake magnets mounted to a sensor carrier and disposed opposite to corresponding fixed iron plates, according to some embodiments.

Turning now to FIG. 2A, an isometric view of a camera module $100_2$ is shown, having brake magnets $136_2$ mounted to a sensor carrier and comprising a single polarization direction magnet and a fixed iron plate, according to some embodiments. The camera module $100_2$ includes two magnetic brakes $136_2$. Magnetic brakes $136_2$, in this embodiment, are comprised of an iron plate 122 embedded in the lens holder 106, and a corresponding aligned brake magnet 124, e.g., a single polarization direction magnet, embedded in the sensor carrier 108. As may now be appreciated, the brake magnet 124 attracts to the iron plate 122, thereby pulling the sensor carrier 108 up towards a desired focus position, e.g., the camera module's "infinity focus" position, i.e., by moving in the positive z-axial direction.

Figure 2B:
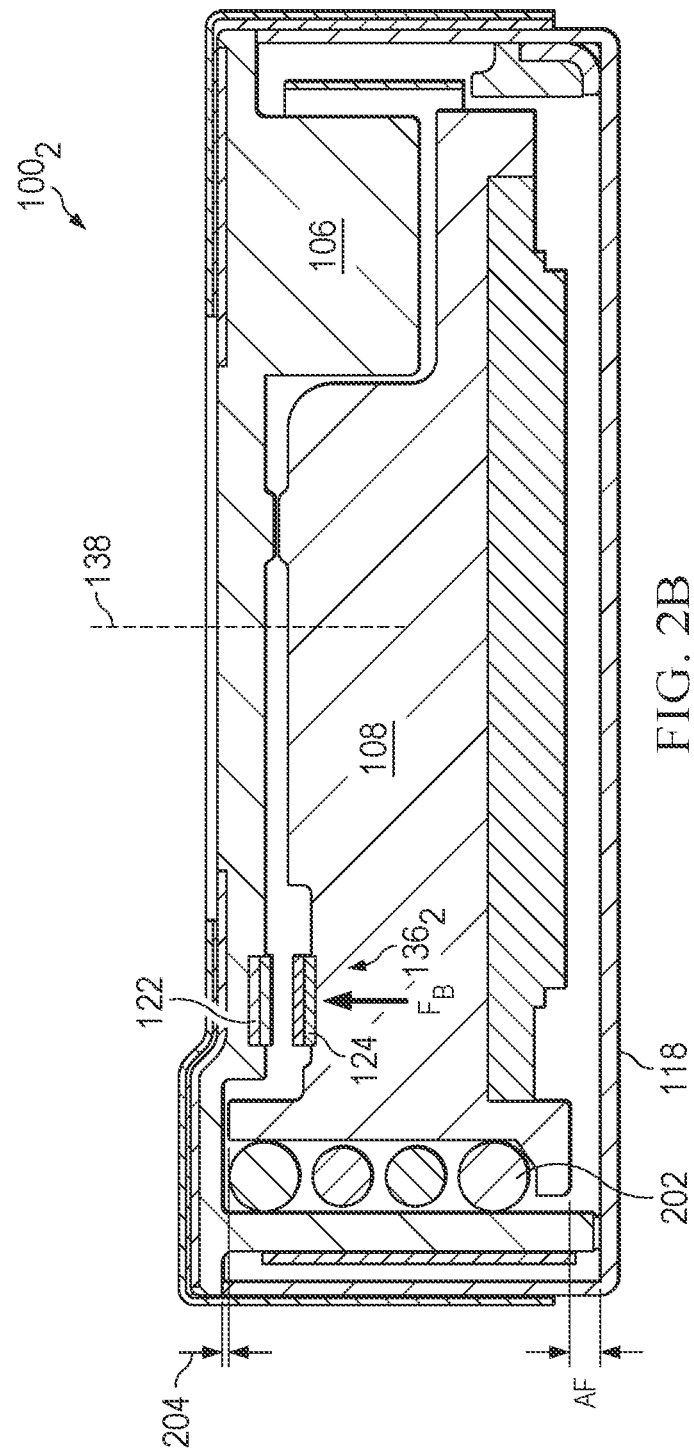
FIG. 2B shows a cross-section of the camera module of FIG. 2A, according to some embodiments.

The various embodiments of magnetic camera brakes disclosed herein, e.g., involving a magnetic attraction or repulsive force between an iron plate and a magnetic body (or between multiple magnetic bodies), are configured to be able to hold or lock the relative motion of moving camera components at a desired optical focus position—even under high amplitude acceleration loads. Thus, the embodiments disclosed herein achieve the best of both a fixed focus camera system and an autofocus camera system. That is, when high disturbance rejection is desired and the camera is being accelerated, the magnetic brake is able to attract the camera to the hyperfocal (i.e., infinity) focus position or some other "desired focus" position (sometimes referred to herein as a "locked" position) with enough force to overcome the external acceleration, thereby enabling high-quality photos and videos to be taken in such use cases. According to some embodiments, the desired focus or "locked" position may include an intentional nominal gap 204 (as shown in FIG. 2B) between the magnet 124 and iron plate 122. Increasing the gap 204 between the magnets and iron plates results in having closer to a linear magnetic attraction force curve, which is easier to control and requires less drive force to overcome the attraction force, e.g., to drive the sensor carrier 108 to a macro focus positions.

Conversely, when "macro" or "close up" photos are desired, e.g., photos of subjects that are located closer to the camera than the hyperfocal distance, some embodiments disclosed herein comprise actuator mechanisms (e.g., actuator mechanism 120) that are strong enough to pull the image sensor out of the desired focus or "locked" position in which it is being held by the magnetic brake and into the macro focus region. Another benefit of some of the embodiments disclosed herein is that the magnetic brake mechanisms 136 are able to lock the camera in position and hold focus at the hyperfocal distance (which is a predominant use case across most types of photography) without actively powering the actuator, thus, the braking mechanisms disclosed herein require very low power consumption to operate. The camera module $100_2$ in FIG. 2A is also marked with a cross section line labeled 2B, which view is illustrated in further detail in FIG. 2B.

FIG. 2B shows a cross-section of the camera module $100_2$ of FIG. 2A, according to some embodiments. The sensor carrier 108 and the lens barrel 102 are disposed in the shield can 118. In some embodiments, the lens barrel 102 is fixed against the shield can 118 and the sensor carrier 108 is movably disposed in the shield can 118 against the lens barrel 102. In other embodiments, the sensor carrier 108 is fixed against the shield can 118 and the lens barrel 102 is movably disposed in the shield can 118 against the sensor carrier 108. The range over which the sensor carrier 108 can move towards the lens barrel 102 to perform autofocusing operations is identified by the label 'AF' in FIG. 2B. The force of the brake magnet 124 being pulled up towards iron plate 122 is also identified by the label FB in FIG. 2B.

The movement of the sensor carrier 108 relative to the lens barrel 102 is constrained in 5 degrees of freedom (i.e., all but the positive z-axial direction along the optical axis 138) by the ball bearings 202. Thus, there is no rocking of the sensor carrier 108 as it moves. The lens barrel 102 is firmly attached to the top of the ball bearing raceway, thereby providing a hard stop in the positive z-axial direction and constraining the 6th degree of freedom. This enables high-quality photos and videos to be captured—even in high acceleration photography environments.

One of the magnetic brakes $136_2$ of FIG. 2A is shown in FIG. 2B in a cross-sectional view. The magnetic brake $136_2$ includes a magnet 124 and an iron plate 122. The magnet 124 is disposed on the top edge of the sensor carrier 108, and the iron plate 122 is disposed on a bottom of the lens barrel 102. The magnet 124 and the iron plate 122 are disposed opposite to each other. The magnet 124 attracts the iron plate 122 with the force FB magnetically. The force FB pulls the sensor carrier 108 towards the lens barrel 102. Plastic bumpers 206, e.g., disposed on the top surface of the sensor carrier 108, may be utilized to prevent the magnet 124 and the iron plate 122 from physically attaching to each other, leaving the aforementioned intentional gap 204 between the two components of the magnetic braking mechanism.

In the position where the magnet 124 is at its closest-possible position to the iron plate 122, the sensor carrier 108 and the lens holder 102 are said to be held in a desired focus or, in this case, "locked" position. In the desired focus position, a motion of the sensor carrier 108 relative to the lens holder 106 is prevented under most high amplitude acceleration loads (excluding "shock" forces on the order of hundreds or thousands of g's). In the desired focus position, the sensor carrier 108 comes to a hard end stop relative to the lens barrel 102, and the distance between the sensor in the sensor carrier 108 and the lens in the lens barrel 102 is the hyperfocal distance (i.e., the distance beyond which nearly all objects can be brought into focus). Therefore, the desired focus position is also the infinity focus position of the camera module $100_2$.

When it comes to rattle acoustics, the camera module $100_2$ remains silent when in the desired focus position and accelerated at a rate of approximately 10 g's or lower (which is representative of an acceleration that may be applied by a user tapping on an electronic device with such a camera module embedded in it). When it comes to power consumption, the magnetic brake $136_2$ locks the camera and holds the focus without powering the actuator mechanism 120 (see FIG. 1B). Thus, the camera actuator mechanism 120 consumes no power while holding the camera module $100_2$ at the hyperfocal distance.

In the event of a shock where the magnetic brake $136_2$ is released forcefully, the iron plate 122 simply separates from the magnet 124. When the shock is over, the sensor carrier 108 is magnetically attracted back to the infinity focus position. In other embodiments, the actuator mechanism 120 may also be used to actively drive the sensor carrier 108 back to the desired focus position. This is done quickly and without optically reestablishing the infinity focus position, since there is a physical datum to drive to. No mechanical parts of the camera module are stressed during this operation, and the camera module $100_2$ therefore recovers gracefully.

In some embodiments, the camera module $100_2$ may also exhibit improved disturbance rejection, which is a measure of how well the camera module can address unexpected accelerations that may cause the camera to lose its focus position. When high frequency acceleration load disturbances are experienced by the camera module $100_2$, magnetic brake $136_2$'s attractive force increases the natural frequency of the camera module $100_2$, thereby allowing the camera module $100_2$ to more effectively attenuate and reject such high frequency acceleration loads. In some situations, the actuator mechanism 120 may also be used to push the sensor carrier 108 into the hard end stop in the positive z-axial direction (i.e., additive to the attractive force of the brake magnet $136_2$), in order to provide even greater disturbance rejection capabilities.

In the use case of macro image photography, i.e., photography of objects closer than the hyperfocal distance, the actuator mechanism 120 may pull the sensor carrier 108 out of the desired focus position and down (i.e., in the negative z-axial direction) into the macro focus position. Therefore, the actuator mechanism 120 may include an electromagnetic coil 126 that exerts a Lorentz force strong enough to overcome the attractive force of the magnet 124.

Figure 3A:
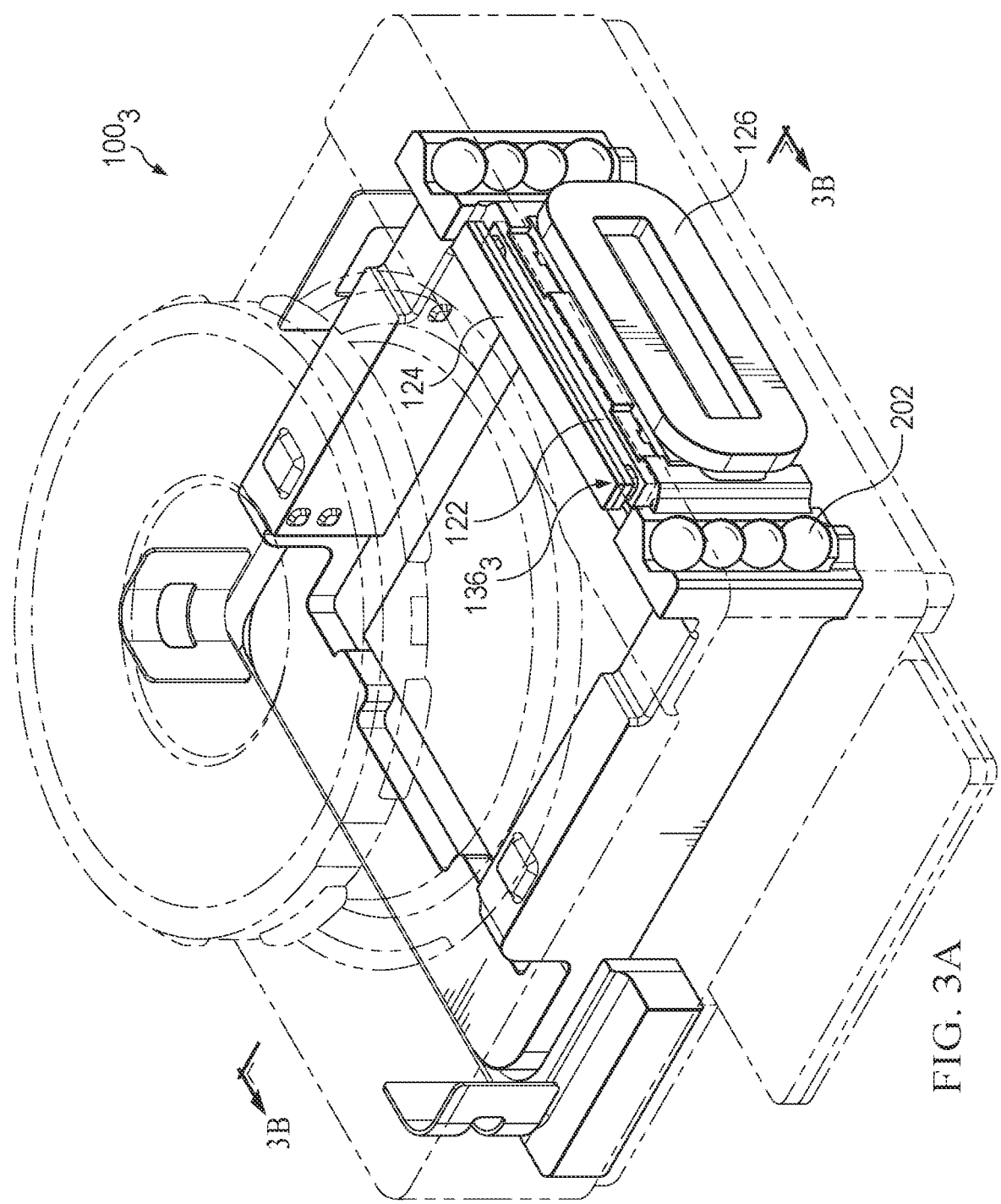
FIG. 3A shows an isometric view of a camera module having a single brake magnet mounted to a lens holder and disposed opposite to a fixed iron plate, according to some embodiments.

Turning now to FIG. 3A, an isometric view of a camera module $100_3$ is shown, having a single brake magnet mounted to a lens holder and disposed opposite to a fixed iron plate on sensor carrier 108, according to some embodiments. (In other embodiments, the orientation of the magnet 124 and iron plate 122 could be reversed, e.g., with iron plate 122 being on top.) The camera module 100 according to FIG. 3A includes a single magnetic brake $136_3$ that is more elongated compared to the magnetic brakes $136_2$ according to FIGS. 2A and 2B. For example, the magnetic brake $136_3$ may be of a similar length as the electromagnetic coil 126. One potential benefit of the design of FIG. 3A, as compared to that of FIG. 2A, is that the longer brake magnet in FIG. 3A produces a higher attraction force due to the larger magnet size. It also has a shorter level arm that could cause the sensor carrier 108 to tilt, as compared to the design of FIG. 2A, which has a longer level arm that could cause the magnetic attraction to make the sensor carrier 108 tilt up, with the far end of the sensor carrier 108 getting closer to the lens barrel 102, which is not desirable. In other words, the design of FIG. 3A has a shorter magnet cantilever distance than that of FIG. 2A. By comparison, the design of FIG. 2A may have a reduced risk of magnetic interference between the two sets of electromagnetics, because it positions the brake magnet 124 and iron plate 122 farther away from the drive magnet 127.

Figure 3B:
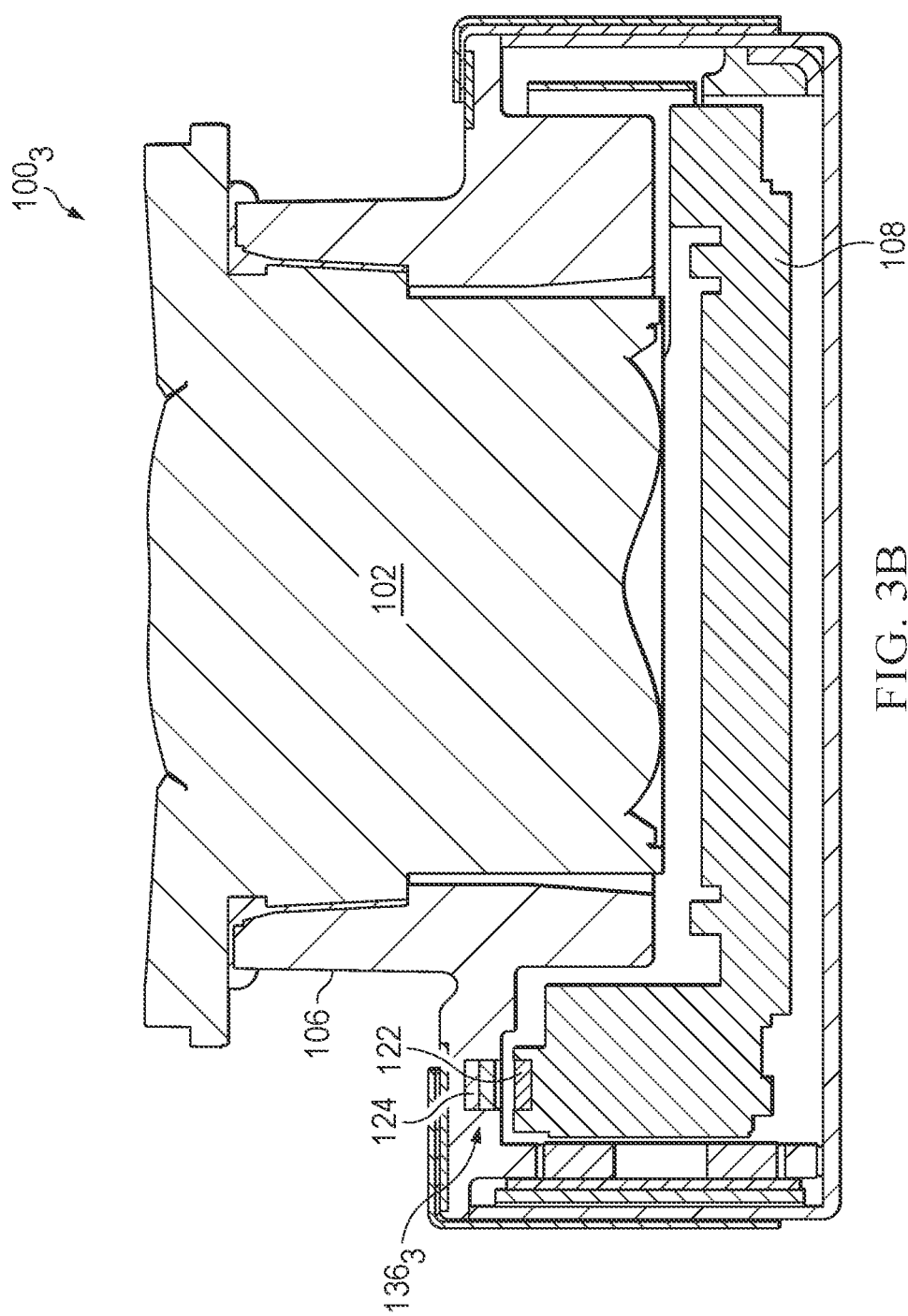
FIG. 3B shows a cross-section of the camera module of FIG. 3A, according to some embodiments.

FIG. 3B shows a cross-section of the center of camera module $100_3$ of FIG. 3A, according to some embodiments. As illustrated in FIG. 3B, the magnetic brake $136_3$ is comprised of an elongated magnet 124 that is disposed on top of the elongated iron plate 122, thereby puling the sensor carrier 108 towards the infinity focus position, as described above.

Figure 4A:
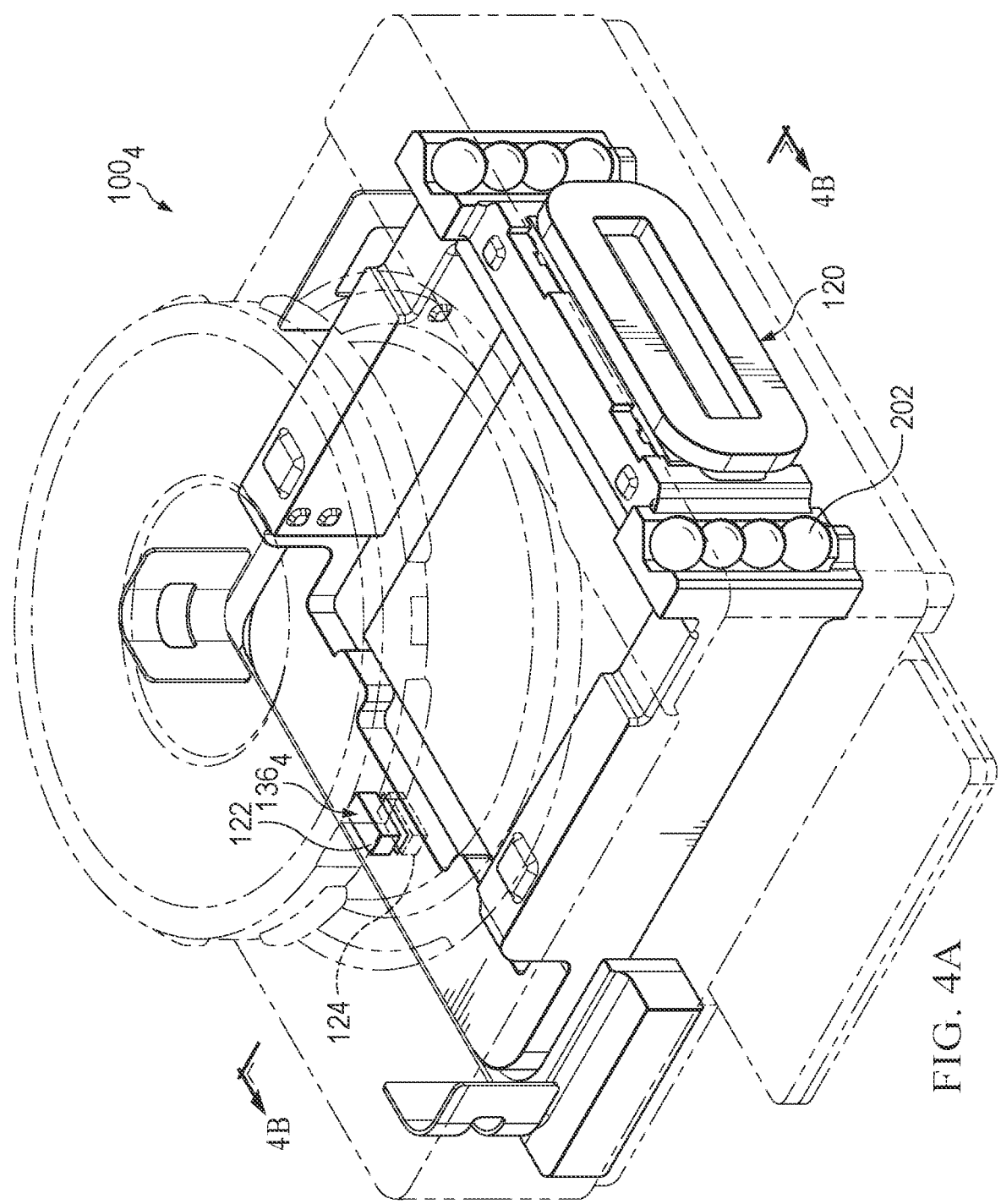
FIG. 4A shows an isometric view of a camera module having a single brake magnet mounted in a cantilevered position to a sensor carrier and disposed opposite to a fixed iron plate, according to some embodiments.

Turning now to FIG. 4A, an isometric view of a camera module $100_4$ is shown, having a single brake magnet 124 mounted in a cantilevered position to a sensor carrier 108 and disposed opposite to a fixed iron plate 122, according to some embodiments. As illustrated, in some embodiments, the brake magnet 124 could be integrated into the sensor carrier 108 and placed below the iron plate 122, which is integrated into the lens holder 106.

Figure 4B:
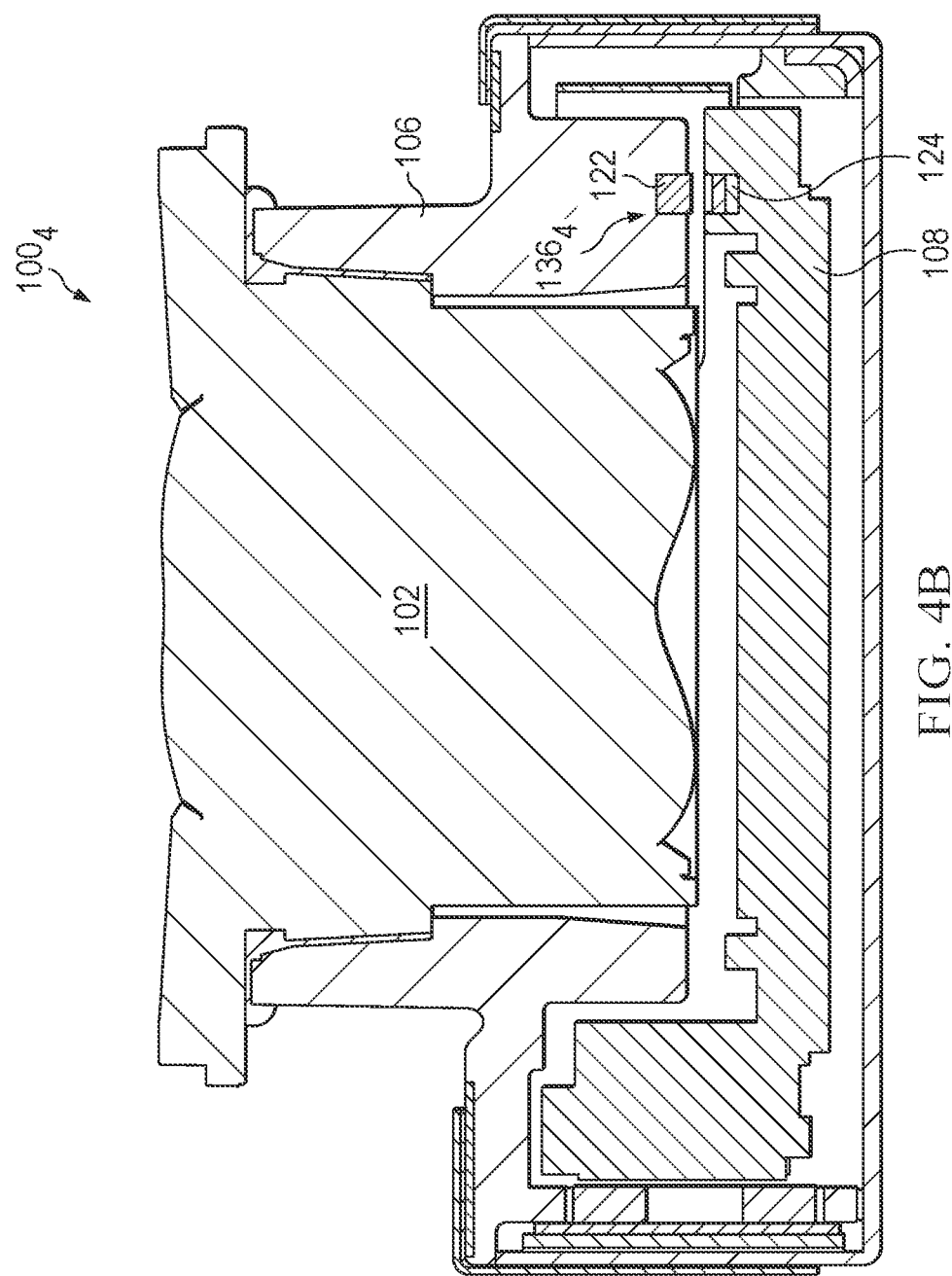
FIG. 4B shows a cross-section of the camera module of FIG. 4A, according to some embodiments.

FIG. 4B shows a cross-section of the center of camera module $100_4$ of FIG. 4A, according to some embodiments. As illustrated in FIG. 4B, the magnetic brake $136_4$ is comprised of brake magnet 124 that is disposed below the iron plate 122, thereby puling the sensor carrier 108 towards the infinity focus position, as described above.

Putting the brake magnet on opposite side of the camera module (e.g., as compared to the embodiments illustrated in FIG. 2B and FIG. 3B) may improve the packaging design, e.g., in terms of the usage of underutilized space within the camera module, and also reduce magnetic interference risk, i.e., by placing the brake magnets and iron plates farther away from the other magnets in the camera module.

For example, according to the illustrated embodiments, the L-shaped sensor carrier 108 piece is not attached anywhere on the right side of the camera module. So, adding a magnetic camera brake on the right side (i.e., the opposite side of ball bearings 202), as shown in FIGS. 4A and 4B, would create a large moment arm to the ball bearings 202. This type of design would potentially risk losing pre-load, i.e., the whole sensor carrier 108 could potentially separate from the ball bearings, causing it to tilt and/or shift. If such tilt is not accounted for in the camera's AF mechanism, it could also cause blurry images to be captured.

Turning now to FIG. 5A, an isometric view of a camera module $100_5$ is shown, having a braking mechanism $136_5$, comprised of dual brake magnets 124a/124b, which are mounted in an orientation causing them to repel from each other, according to some embodiments. Brake magnet 124b is mounted to the bottom of shield can 118, i.e., fixed at the bottom of camera module $100_5$, and brake magnet 124a is integrated into the sensor carrier 108.

FIG. 5B shows a cross-section of the camera module of FIG. 5A, according to some embodiments. As shown in FIG. 5B, the poles of the dual brake magnets 124a/124b are oriented so as to repel each other, thereby pushing the sensor carrier 108 towards the infinity focus position. By putting the top magnet on the bottom side of the sensor carrier 108, the sensor carrier 108 will be pushed upwards, rather than being pulled up to the top to make contact with the lens holder.

Figure 6:
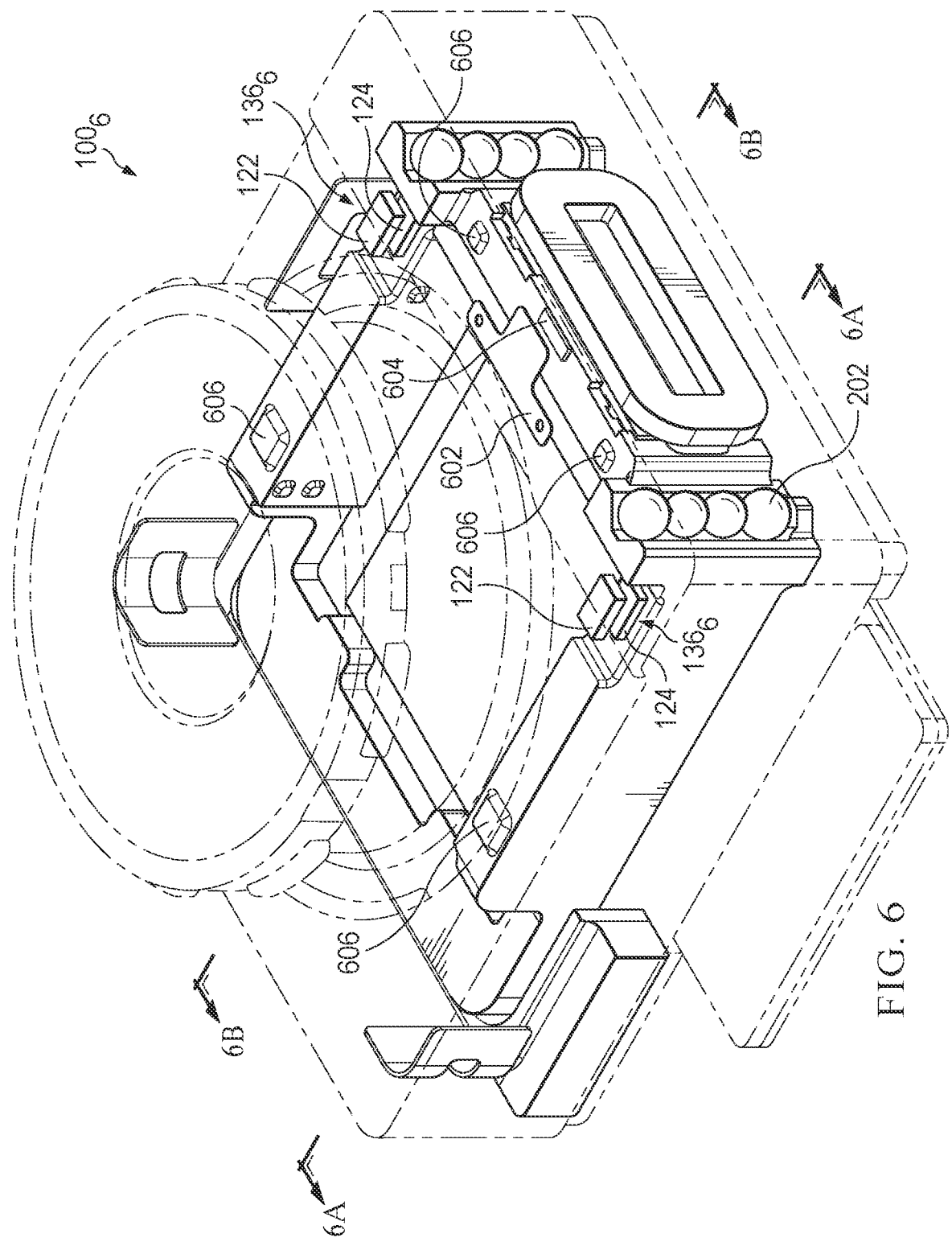
FIG. 6 shows an isometric view of a camera module having a spring bumper configured to act as a soft end stop for a sensor carrier, according to some embodiments.

Turning now to FIG. 6, an isometric view of a camera module $100_6$ is shown, having a spring bumper 602 configured to act as a soft end stop for a sensor carrier 108, according to some embodiments. In some embodiments, the sensor carrier 108 may also comprise an integrated carrier bumper 604 disposed opposite the spring bumper 602, which may help to reduce contact stresses between the components. The spring bumper 602 may work in conjunction with the desired magnetic brake mechanism, such as camera brake $136_6$ (e.g., consisting of the aforementioned magnet 124 and iron plate 122 pairing), wherein the spring bumper 602 can act as a soft end stop to account for extra stroke that may be needed to athermalize the camera, that is, make the camera's autofocus system more resistant to errors that may be caused by temperature changes within the camera module.

To explain further, one challenge faced by fixed focus cameras is that, if they heat up (or cool down) significantly, the actuator mechanism may need to adjust the lens or sensor further to keep the camera in focus, e.g., if there is no optical stroke remaining. Thus, instead of pinning the magnetic brake $136_6$ to a hard end stop, embodiments such as FIG. 6 may employ a spring bumper element that is much stiffer than the main travel, but not as hard as a hard stop (e.g., a plastic bumper). Thus, after the magnetic brake(s) have been attracted to their "soft stop" position, according to these spring-based embodiments, an actuator mechanism may still drive the sensor carrier 108 (e.g., by a few additional microns) as conditions inside the camera module heat up (or cool down), in order to maintain the camera's focus.

In some such embodiments, the infinity focus position may be at a partially-depressed state of the spring, i.e., not before spring contact and not when the spring is fully compressed. That is, there may be some amount of spring compression, wherein the magnetic force generated by the magnetic brake is in balance with the spring force applied by the spring bumper 602, e.g., with each being at approximately 50 mN of force in some embodiments. As may now be appreciated, the spring bumper 602 may provide an additional margin of movement for the sensor between the default "desired focus" position, e.g., an infinity focus position, and the hard stop in the positive-z axial direction (e.g., when the spring is fully compressed).

In some embodiments, to determine whether there is a need to apply athermalization to the camera's AF system, the image sensor itself could have temperature sensor to detect temperature anomalies, the circuit board could have temperature sensor, or the image signal processor (ISP) could analyze a captured image to determine if it is in focus, etc.

Figure 6A:
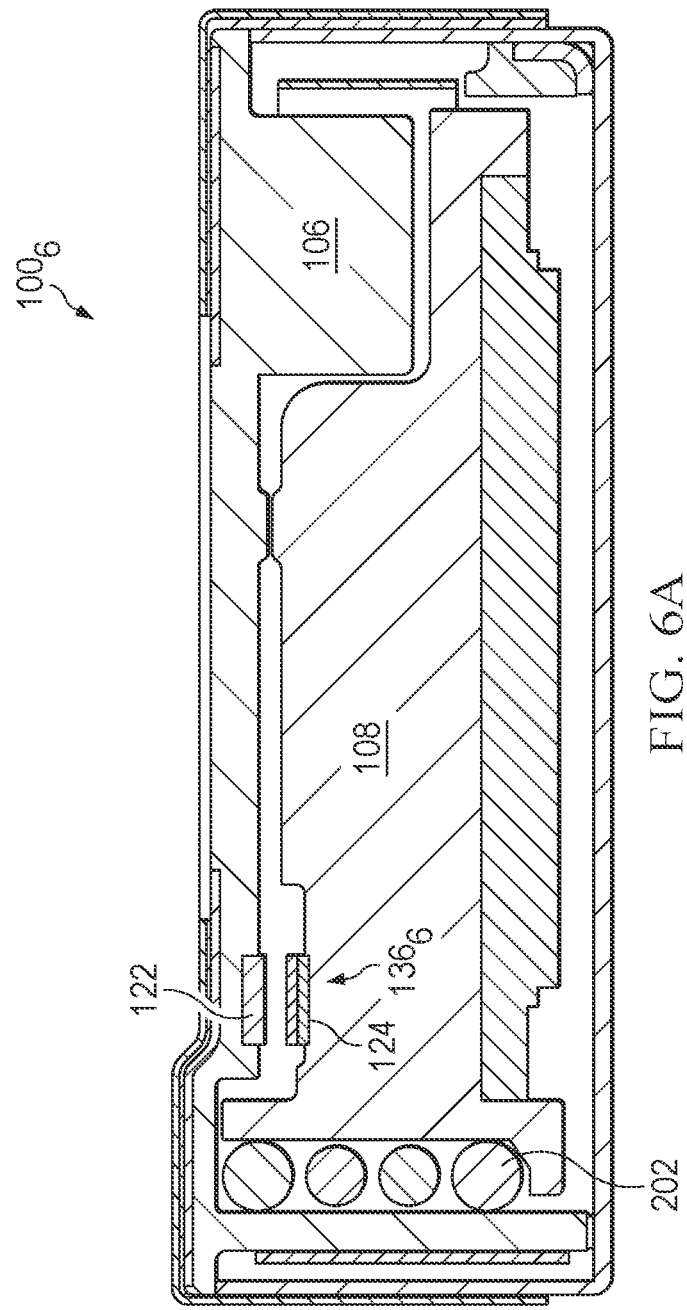
FIG. 6A shows a cross-section of the camera module of FIG. 6, according to some embodiments.

FIG. 6A shows a cross-section of the camera module $100_6$ of FIG. 6, according to some embodiments. As illustrated, the cross-section shown in FIG. 6A has the magnetic brake $136_6$, comprised of an iron plate 122 and magnet 124, in a similar configuration to that of FIG. 2A, though it is to be understood that any desired camera braking mechanism(s) and configuration may be used in conjunction with a soft end stop implemented using a spring bumper (as shown in FIG. 6), in accordance with the needs of a given implementation.

Figure 6B:
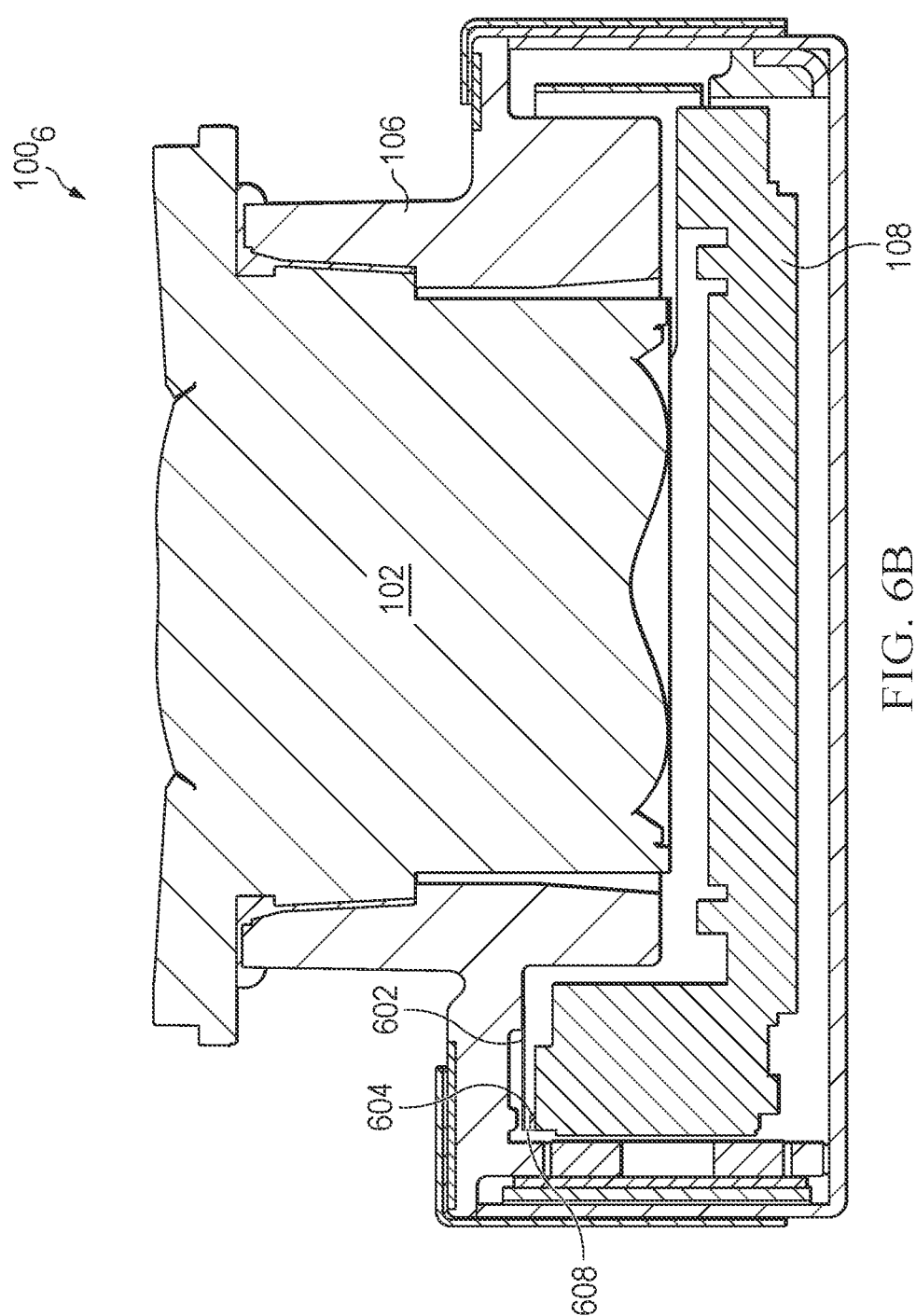
FIG. 6B shows another cross-section of the camera module of FIG. 6, according to some embodiments.

FIG. 6B shows another cross-section through a central portion of the camera module $100_6$ of FIG. 6, according to some embodiments. FIG. 6B illustrates an intentional gap 608 that is present between the spring bumper 602 and carrier bumper 604. In some implementations, the spring bumper and/or carrier bumper (or other bumpers in the system, such as sensor carrier bumpers 606, shown in FIG. 6) may preferably be formed from a low durometer polymer, so as to dampen the sensor carrier's impacts in a drop or shock event. The bumpers could preferably be made plastic or a lower durometer polymer, such as a soft rubber material, or other material that is more compliant than the spring and/or other plastic parts within the camera module.

When the sensor carrier is pinned up against the spring bumper, it makes the overall AF system stiffer. Thus, according to some embodiments, the AF system controller could have multiple modes of control, e.g., a "main" mode for when the spring is operating with normal stiffness, and then "stiff" mode for the end of the optical stroke range, when the system has higher stiffness. As may now be understood, the use of a spring bumper can increase the AF system's bandwidth at infinity focus—and allow it to perform better vibration rejection.

Figure 7A:
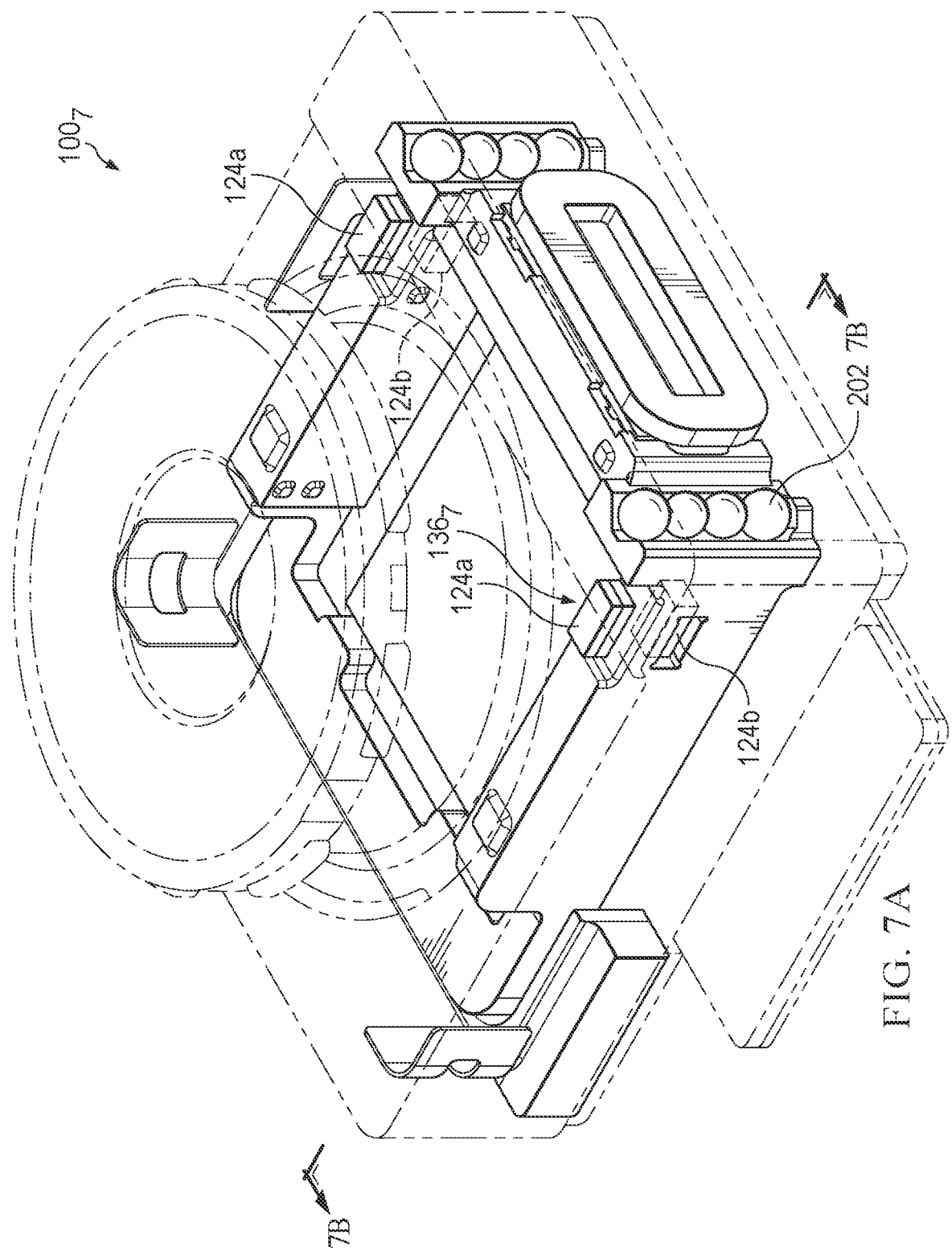
FIG. 7A shows an isometric view of a camera module having two single polarization direction magnets to attract one another, according to some embodiments.

Turning now to FIG. 7A, an isometric view of a camera module $100_7$ is shown, having two magnetic camera brakes $136_7$, each comprised of two single polarization directional magnets $124a/124b$ oriented to attract one another, according to some embodiments. The embodiment illustrated in FIG. 7A thus differs from the embodiment illustrated in FIG. 2A, which features a magnet 124 and iron plate 122 that attract each other. Camera module $100_7$'s usage of multiple magnets and no iron plates in the camera brake mechanism helps to increase the attraction force and leaves a larger air gap between magnets, which can help achieve closer to a linear magnetic attraction force curve. In other embodiments, the magnets may be oriented to repel one another, i.e., rather than attract one another, in order to engage the camera brake. In still other embodiments, other types of directional magnets, e.g., dual polarization direction magnets (or magnets with additional polarization directions), could also be utilized in the magnetic camera brake mechanism.

Figure 7B:
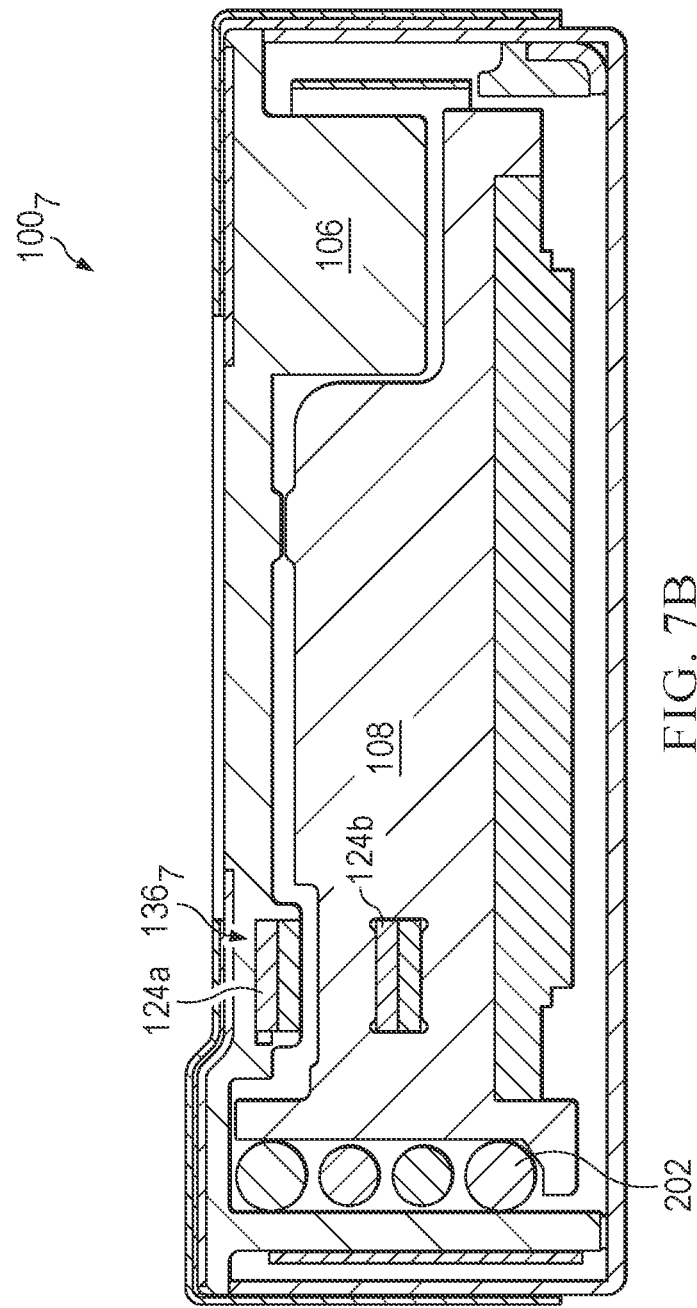
FIG. 7B shows a cross-section of the camera module of FIG. 7A, according to some embodiments.

FIG. 7B shows a cross-section of the camera module of FIG. 7A, according to some embodiments. As may now be appreciated, by attracting to one another, the sensor carrier 108 is moved up into and held at the desired focus position (e.g., the infinity focus position) in a non-power consuming way, as discussed above.

It is noted that the camera modules as described and illustrated herein may beneficially have a dynamic flex to route image sensor signals and feature a fixed lens with a moving image sensor carrier. However, in alternative camera module embodiments, the end stops (e.g., magnets/iron plates pairings) could be implemented on a lens shift camera as well, where the image sensor is fixed and the lens normally moves, and wherein the brake would stop the lens from moving (rather than stopping the sensor carrier from moving).

Although the aspects above have been described in considerable detail, numerous variations and modifications will become apparent to those skilled in the art once the above disclosure is fully appreciated. It is intended that the following claims be interpreted to embrace all such variations and modifications.

The invention claimed is:

1. A camera module, comprising:
   a housing;
   a sensor configured to capture an image;
   a lens with an optical axis, wherein the lens is configured to focus light from an object onto the sensor to capture the image, and wherein the sensor is movable relative to the lens along the optical axis;
   a lens holder that holds the lens;
   a sensor carrier that carries the sensor and
   a magnetic brake that holds the sensor relative to the lens in a desired focus position, wherein the magnetic brake comprises two magnets, wherein a first magnet of the magnetic brake is included in the sensor carrier, wherein a second magnet of the magnetic brake is included in the housing, and wherein the first magnet and second magnet are configured to repel each other, thereby pushing the sensor carrier towards the desired focus position.

2. The camera module of claim 1, wherein the desired focus position is at an infinity focus position for the camera module.

3. The camera module of claim 1, wherein the magnetic brake comprises: a magnet included in the lens holder; and a ferromagnetic material included in the sensor carrier.

4. The camera module of claim 1, wherein the magnetic brake comprises a magnet included in the sensor carrier, and a ferromagnetic material included in the lens holder.

5. The camera module of claim 1, wherein the magnetic brake comprises two magnets, wherein a first magnet is included in the sensor carrier and a second magnet is included in the lens holder.

6. The camera module of claim 5, wherein the first magnet and second magnet are configured to attract each other, thereby pulling the sensor carrier towards the desired focus position.

7. The camera module of claim 4, wherein the ferromagnetic material comprises one or more of: alnico, bismanol, caesium hexafluorocobaltate(IV), californium, chromium (IV) oxide, cobalt, cobalt ferrite, complex oxide, dysprosium, erbium, Europium hydride, fernico, ferrite (magnet), gadolinium, gallium manganese arsenide, greigite, heusler compound, hexagonal ferrite, holmium, iron, KS steel, magnadur, magnetic 2D materials, magnetic semiconductor, magnetite, metglas, MKM steel, monostrontium ruthenate, neodymium magnet, nickel, permalloy, polder tensor, rare-earth magnet, samarium-cobalt magnet, sendust, suessite, terbium, uranium hydride, vicalloy, and yttrium iron garnet.

8. The camera module of claim 1, wherein the desired focus position comprises a locked position for the camera module.

9. The camera module of claim 1, further comprising an actuator mechanism that is configured to be able to release the magnetic brake from the desired focus position when activated.

10. The camera module of claim 9, wherein the actuator mechanism comprises a voice coil actuator.

11. The camera module of claim 1, further comprising a spring that provides a soft end stop for the sensor carrier at the desired focus position.

12. The camera module of claim 11, wherein the spring further comprises a spring bumper.

13. The camera module of claim 12, wherein the spring bumper is formed of a low durometer polymer material that is more compliant than the spring.

14. The camera module of claim 11, wherein the spring is configured to be in a partially compressed state when the sensor is in the desired focus position.

15. The camera module of claim 1, wherein the magnetic brake comprises a single magnet and a single corresponding aligned ferromagnetic material.

16. The camera module of claim 1, wherein the magnetic brake comprises a pair of magnets and a pair of corresponding aligned ferromagnetic materials.

17. A camera module, comprising:

a sensor configured to capture an image;

a lens with an optical axis, wherein the lens is configured to focus light from an object onto the sensor to capture the image, and wherein the sensor is movable relative to the lens along the optical axis; and a magnetic brake that holds the sensor relative to the lens in a desired focus position, wherein the magnetic brake comprises at least one pair of single polarization directional magnets oriented to attract one another.

18. The camera module of claim 17, wherein the desired focus position is at an infinity focus position for the camera module.

19. The camera module of claim 17, wherein the desired focus position comprises a locked position for the camera module.

20. The camera module of claim 17, further comprising an actuator mechanism that is configured to be able to release the magnetic brake from the desired focus position when activated.

\* \* \* \* \*